United States Patent [19]

Siccardi et al.

[11] Patent Number: 5,496,987
[45] Date of Patent: Mar. 5, 1996

[54] ELECTRIC OVEN, FOR DOMESTIC USE, PARTICULARLY DESIGNED TO COOKING PIZZAS, CAKES AND THE LIKE

[76] Inventors: Enrico Siccardi; Alberto Siccardi, both of Via B. Panizza, 20144 Milan; Roberto Lombardi; Luigi Lombardi, both of Via S. Pancrazio 18/10, 20060 Gessate (Milan), Italy

[21] Appl. No.: 255,450

[22] Filed: Jun. 8, 1994

[30] Foreign Application Priority Data

Jun. 10, 1993 [IT] Italy .................. MI93U0479

[51] Int. Cl.⁶ ............................................ F24C 7/10
[52] U.S. Cl. .................. 219/386; 219/387; 219/388; 99/447; 126/21 A
[58] Field of Search ............................ 219/383, 387, 219/391, 386, 409, 411, 406, 403; 99/447, 423; 126/214, 41 A

[56] References Cited

U.S. PATENT DOCUMENTS

| 3,433,930 | 3/1969 | Knapp | 219/386 |
| 3,714,394 | 1/1973 | Evans | 219/409 |
| 4,164,643 | 8/1979 | Peart et al. | 219/411 |
| 4,276,465 | 6/1981 | Flavio | 219/388 |

Primary Examiner—Tu Hoang
Attorney, Agent, or Firm—Bucknam and Archer

[57] ABSTRACT

An improved electric oven comprises a base on which is supported a covering construction, the base housing a pair of metal heating coils to be coupled to the electric mains by electric cables and connected to the rear wall of the oven base, a cooking plate being moreover provided which can slide between the coils along guides applied to two side inner walls of the base.

5 Claims, 3 Drawing Sheets

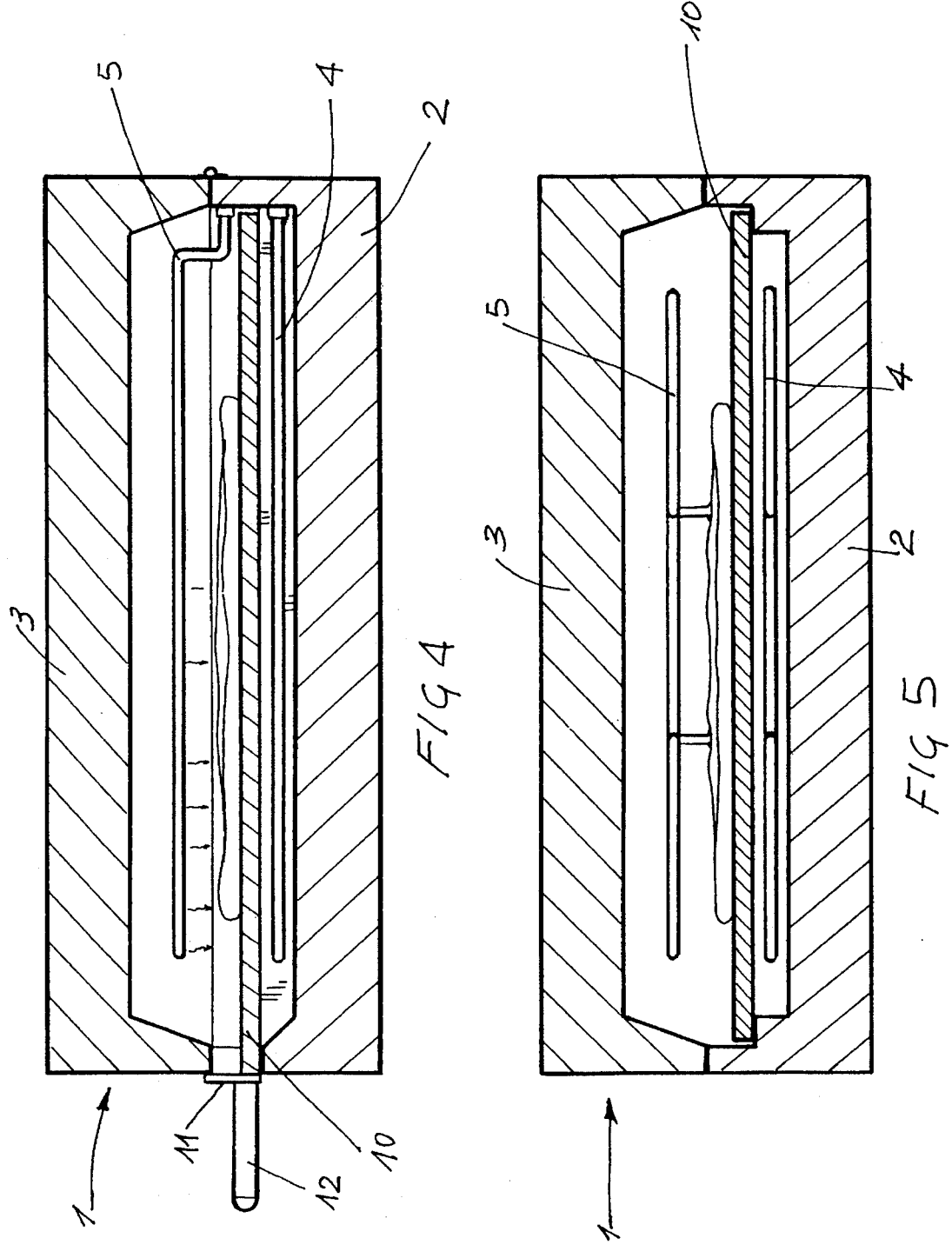

ELECTRIC OVEN, FOR DOMESTIC USE, PARTICULARLY DESIGNED TO COOKING PIZZAS, CAKES AND THE LIKE

BACKGROUND OF THE INVENTION

The present invention relates to an improved electric oven, particularly designed for cooking pizzas, cakes and the like and which can be used in domestic environments.

As is known, there are at present available several types of electric ovens for domestic use, for cooking pizzas and cakes.

These prior ovens usually comprise a bottom portion, made of suitable materials, which is provided in its inside with electric heating elements, on the top of which there is arranged a cooking plate, a covering element covering this construction.

In some prior ovens, the covering can be raised and removed in order to allow the pizza or cake to be introduced into or extracted from the oven, and in order to visually monitor the cooking process.

In the top covering further heating elements can be housed, adapted to perfectly cook the top portion of the pizza.

The above mentioned top covering is usually hinged to the bottom portion of the oven, so as to be easily open, to allow the pizza to be introduced into and removed from the oven.

With the disclosed arrangement, it is possibly to fixedly engage with the top covering further heating elements, which will be connected to the bottom heating elements by means of suitable electric cables.

The above disclosed prior electric ovens, on the other hand, have the drawback that they require a comparatively high power amount, since each individual operation for raising or opening the covering causes a great heat loss.

Accordingly, in order to recover the temperature of the inside of the oven it is necessary to increase the applied heating power.

Moreover, each temperature variation in the inside of the oven will cause a not perfect cooking of the pizza or cake.

To the foregoing it is to be further added that prior electric ovens have a comparatively large size, which is further increased during the mentioned covering raising and opening operations.

SUMMARY OF THE INVENTION

Accordingly, the aim of the present invention is to overcome the above mentioned problems and drawbacks, by providing an improved electric ovens for cooking pizzas, cakes and the like which has a low electric power consume, and is adapted to reduce to a minimum possible heat losses.

Within the scope of the above mentioned aim, a main object of the present invention is to provide such an improved electric oven which is adapted to perfectly and quickly cook pizzas and cakes, in particular both the bottom and top surfaces of the latter.

Another object of the present invention is to provide such an improved electric oven which has a very reduced size, in particular as the pizza is introduced thereinto end as the cooking condition thereof is monitored.

Another object of the present invention is to provide such an improved electric oven which, owing to its constructional features, is very reliable and safe in operation and which, moreover, can be easily made starting from easily available elements and materials.

Yet another object of the present invention is to provide such an improved electric oven which is very competitive from a mere economic standpoint.

According to one aspect of the present invention the above mentioned aim and objects, as well as yet other objects, which will become more apparent hereinafter, are achieved by an improved electric oven, for domestic use, particularly designed for cooking pizzas, cakes and the like, characterized in that said oven comprises an oven base thereon is supported, by plug-in means, a covering construction.

The oven base, in particular, is so designed as to house a pair of metal coils, which are coupled to the electric mains by suitable cables and being adapted to operate as a heating assembly.

The mentioned coils are rigidly connected to the inner rear wall of the oven.

A cooking plate is moreover provided which can slide, between the mentioned coils, along suitable guides which are provided along the side walls of the oven base.

BRIEF DESCRIPTION OF THE DRAWINGS

Further characteristics and advantages of the present invention will become more apparent hereinafter from the following detailed disclosure of a preferred, though not exclusive, embodiment thereof, which is illustrated, by way of an indicative, but not limitative example, in the figures of the accompanying drawings, where:

FIG. 4 is a side cross-sectional view of the improved electric oven; and

FIG. 5 is a front cross-sectional view of the subject improved oven.

DESCRIPTION OF THE PREFERRED EMBODIMENT

With reference to the number references of the figures of the accompanying drawings, the improved electric oven, for domestic use, for cooking pizzas, cakes and the like, according to the present invention, which has been generally indicated at the reference number 1, comprises a base 2, made of a thermally resistant material, on which there is supported a covering construction 3, which can be raised, in order to open the oven.

Figure 1:
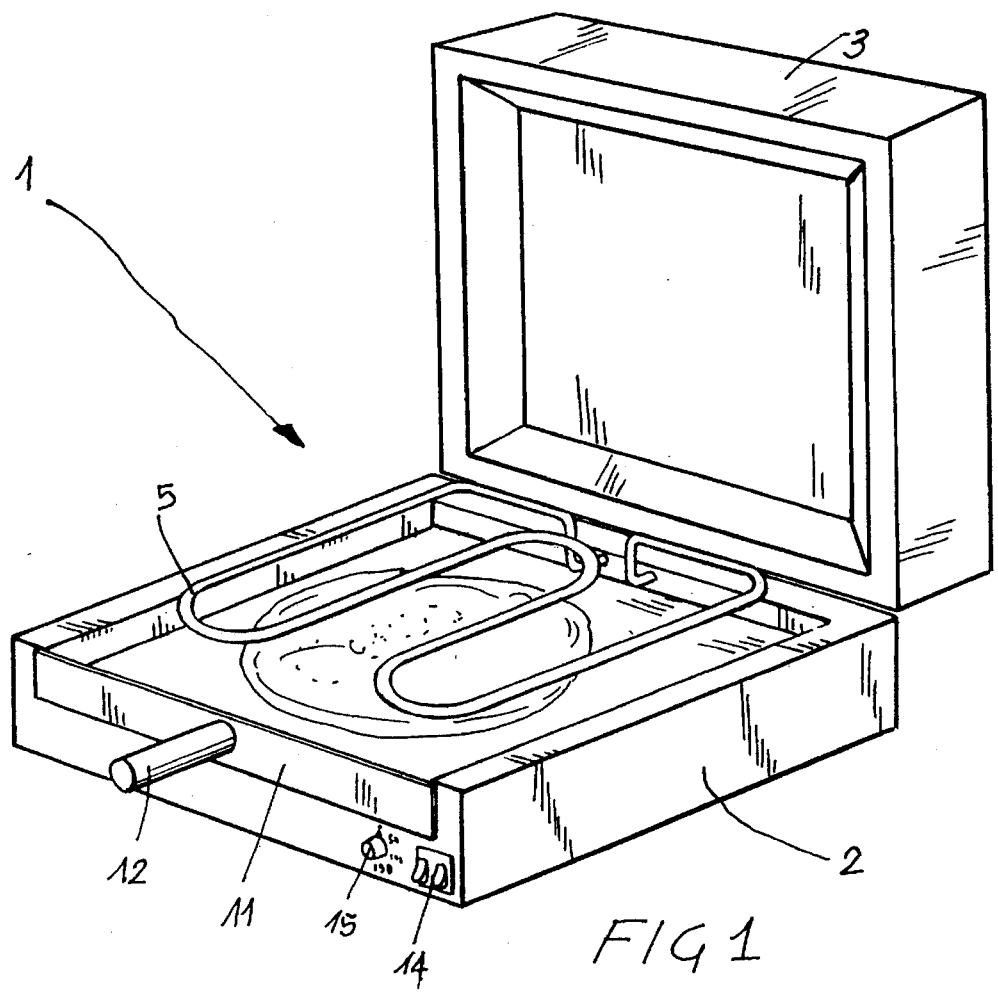
FIG. 1 is a perspective view of the improved electric oven according to the present invention, in which the top of the oven is open so as to allow the oven to be easily cleaned.
Figure 2:
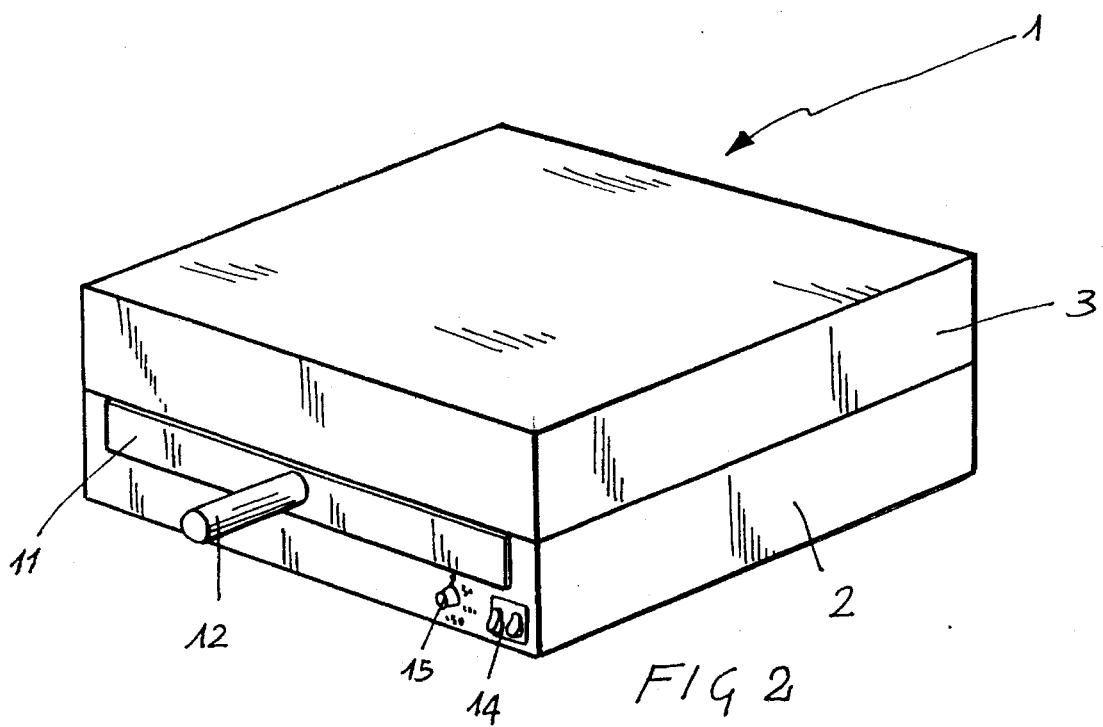
FIG. 2 is a perspective view of the improved electric oven, with its top covering in a lowered condition.
Figure 3:
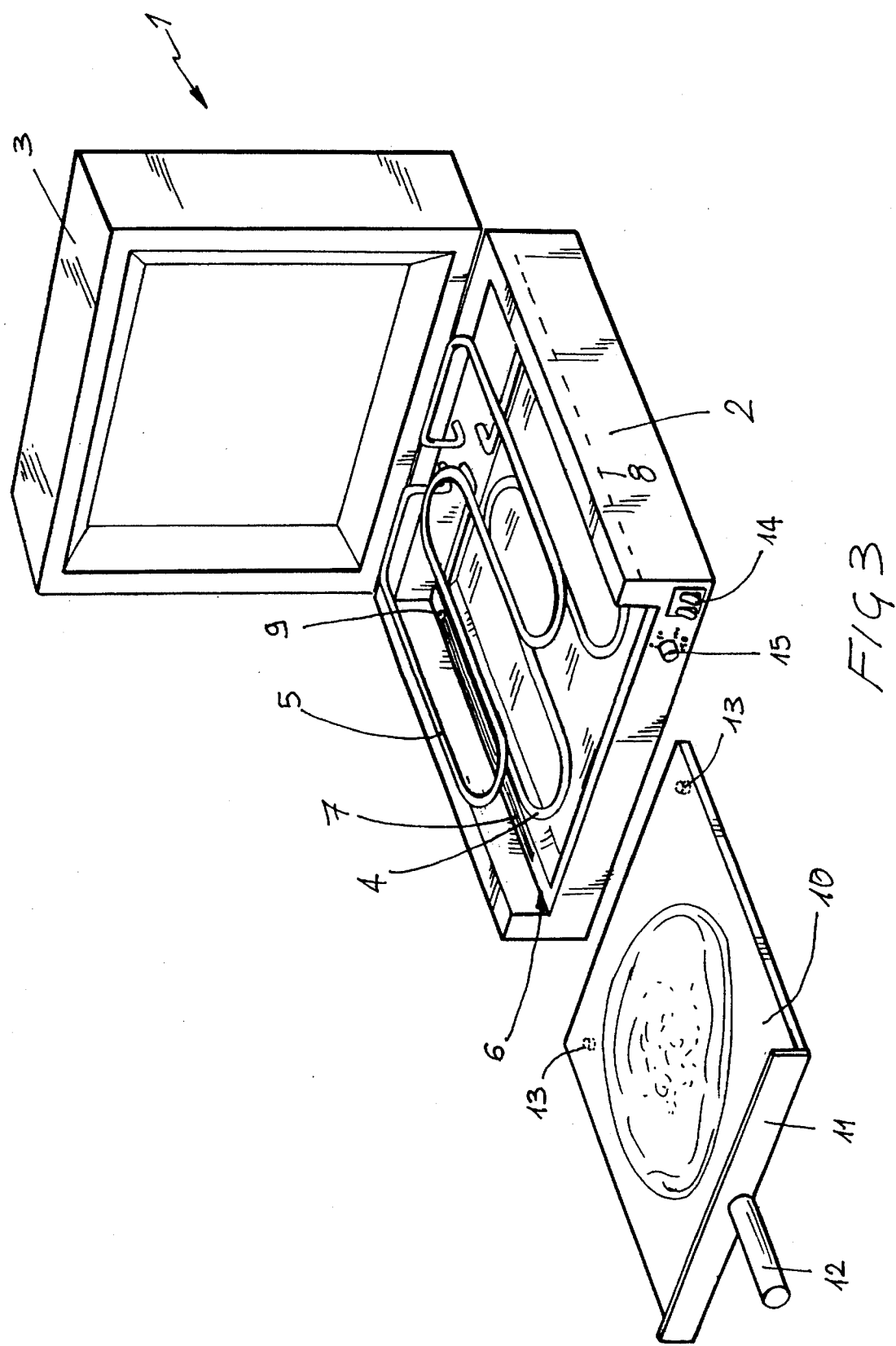
FIG. 3 is a further perspective view of the oven according to the invention, in which the cooking plate is fully withdrawn.

As the mentioned covering 3, the inner surface thereof is lined by a thermally insulating material, is in a closed condition, the improved oven will have a parallelepipedal configuration, as is shown in FIG. 2.

The inside of the oven base 2 is coated by a thermally insulating material end is so designed as to house a pair of metal coils, which are superimposed onto one another and are suitably spaced, end being adapted to operate as a heating assembly.

A main feature of the improved electric oven according to the present invention is that the pair of heating coils are housed in the oven base or bottom.

More specifically, a coil 4 is adapted to form the bottom portion of the heating assembly, whereas the coil 5 is arranged on the top of the first, as is shown in FIGS. 4 and 5.

The mentioned oven base or bottom is moreover provided with a front opening, indicated at the reference number 6, which is arranged at the oven portion opposite to the wall where is affixed the mentioned pair of metal coils.

Moreover, the oven base 2 is provided in its inside with two guides 7 and 8, each of which is provided, at a respective end portion thereof, with a circular hole or slot 9.

As shown, the subject electric oven 1 further comprises a cooking plate 10, the top surface of which is preferably made of a baked clay material, and having a front wall 11 provided with a suitable handle 12.

To the bottom surface of said plate there are affixed two cylindric pins 13.

These pins, in particular, can be engaged in the circular slots 9 so as to slide inside said guides 7 and 8 to allow the cooking plate 10 to be engaged in the base 2.

More specifically, the cooking plate 10 can slide inside the oven base or bottom 2, so as to be arranged between the bottom coil 4 and the top coil 5, as shown in FIGS. 4 and 5.

Upon having properly arranged the cooking plate 10 in the oven base 2, by causing said cooking plate to slide along the guides 7 and 8, and if the covering 3 is applied to and rests on the oven base, the front wall 11 will close the opening 6 of the base, so as to perfectly thermally insulate the inside space of the oven 1.

On the front portion of the base 2 there are moreover provided a pair of switches 14 for turning on the oven, as well as a warning lamp 15 of the thermostat, which is arranged on the rear portion of said oven base, within a suitable recess.

The rear portion of the oven base is provided, finally, with connecting cables for coupling with the power supply electric mains.

From an operation standpoint, at the end of the starting heating step of the oven 1, it will be sufficient to withdraw the plate 10 and arrange thereon the pizza or cake to be cooked, and then introduce again the cooking plate into the oven base.

The coil 4 will perfectly cook the bottom or under surface of the pizza, whereas the coil 5 will perfectly cook, in a well balanced manner, the top surface thereof.

A proper adjustement of the cooking temperature will be performed by the mentioned thermostatic switch including the warning lamp 15.

In this connection, it should be pointed out that during operation the electric oven will be perfectly closed, the cooking condition of the pizza being monitored by simply withdrawing, for a very reduced time, the cooking plate 10, by causing it to slide along the above mentioned sliding guides.

Thus, the covering 3 can be held in a closed condition during the operation of the oven, thereby preventing heat losses.

On the other hand, the covering 3 can be advantageously opened for the necessary cleaning operations, in which it is possible to fully withdraw and remove the mentioned cooking plate from the base or bottom of the oven.

From the above disclosure it should be apparent that the invention fully achieves the intended aim and objects.

In this connection, it should be pointed out that, in the subject improved electric oven, there are eliminated possible burning dangers as the pizza is removed, due to a contact of the operator body with the heating coils, since, during its operation, the subject electric oven will be perfectly closed.

Moreover, in the improved electric oven of the invention, fumes and bad odors can not be released into the encompassing environment.

The invention as disclosed is susceptible to several modifications and variations all of which will come within the scope of the inventive idea.

Moreover, all of the details can be replaced by other technically equivalent elements.

In practicing the invention, the used materials, provided that they are compatible to the intended use, as well as the contingent size and shapes, can be any according to requirements.

We claim:

1. An electric oven for cooking pizzas, cakes and the like, comprising an oven base, on which there is applied a raisible covering construction, and said base housing a pair of lower and top metal heating coils connected to an inner rear wall of said oven base, said oven being moreover provided with a cooking plate which slides between said pair of metal coils along guides applied to two side walls of said base.

2. An electric oven, according to claim 1, wherein said base and covering construction are made of a thermally resistant material lined with a thermal insulating material.

3. An electric oven, according to claim 1, wherein said cooking plate is provided with a top surface made of a baked clay material and had a front wall provided with a handle, and on a lower surface of said cooking plate being provided two cylindric pins.

4. An improved electric oven, according to claim 3, wherein said cylindric pins of said cooking plate are engageable in circular slots provided at respective end portions of said guides for sliding in said guides so as to allow said cooking plate to be introduced into said base.

5. An electric oven, according to claim 1, wherein on a front portion of said oven base there is arranged a warning lamp indicative of an on state.

\* \* \* \* \*